(12) United States Patent
van den Berg

(10) Patent No.: US 7,415,941 B1
(45) Date of Patent: Aug. 26, 2008

(54) FEEDING AND/OR DRINKING COLUMN ON BEHALF OF ANIMALS

(75) Inventor: Karel van den Berg, Bleskensgraaf (NL)

(73) Assignee: Lely Research Holding AG, Zug (CH)

( * ) Notice: Subject to any disclaimer, the term of this patent is extended or adjusted under 35 U.S.C. 154(b) by 530 days.

(21) Appl. No.: 09/642,828

(22) Filed: Aug. 22, 2000

Related U.S. Application Data

(63) Continuation of application No. PCT/NL99/00791, filed on Dec. 21, 1999.

(30) Foreign Application Priority Data

Dec. 24, 1998 (NL) .................................. 1010898

(51) Int. Cl.
*A01K 5/00* (2006.01)
*A01K 5/02* (2006.01)
*G01G 13/22* (2006.01)
*G01G 13/00* (2006.01)

(52) U.S. Cl. ........................ 119/51.02; 119/52.1; 119/53

(58) Field of Classification Search .............. 119/51.02, 119/52.1, 53
See application file for complete search history.

(56) References Cited

U.S. PATENT DOCUMENTS

| | | | | |
|---|---|---|---|---|
| 2,755,770 | A | * | 7/1956 | Ruedemann ................ 119/52.1 |
| 2,969,769 | A | * | 1/1961 | Paschall .................... 119/56.1 |
| 3,336,907 | A | | 8/1967 | Thompson .................... 119/56 |
| 4,361,590 | A | * | 11/1982 | Wojcik ........................ 426/417 |
| 4,559,904 | A | * | 12/1985 | Harmsen ................... 119/51.02 |
| 5,069,165 | A | * | 12/1991 | Rousseau .................. 119/51.02 |
| 5,377,620 | A | * | 1/1995 | Phillippi ................... 119/51.12 |
| 5,680,829 | A | | 10/1997 | Payne .......................... 119/53 |
| 5,740,757 | A | * | 4/1998 | Smeester .................. 119/51.02 |
| 6,371,047 | B1 | * | 4/2002 | van den Berg .......... 119/51.02 |

FOREIGN PATENT DOCUMENTS

DE          3009963          1/1981

(Continued)

*Primary Examiner*—Bret Hayes
(74) *Attorney, Agent, or Firm*—Howrey LLP

(57) ABSTRACT

An apparatus for feeding and providing water to animals, such as cows or goats, comprises a framework having a central axis. A plurality of reservoirs are connected to a framework in its upper aspects and feeding troughs are disposed below the reservoirs. At least one metering device for metering feed or drink or both to the feeding troughs is provided between the reservoirs and feeding troughs. Each feeding trough has a sensor for identifying an animal feeding at the feeding trough. The metering device which delivers feed or water or both to the feeding trough is controlled by a computer memory to deliver selected fodder from the reservoirs to each feeding trough in accordance for the nutritional needs of the animal which is at said trough. The control of the fodder relates both to the speed that the animal is eating and to data stored in the memory as to the nutrition needs of that animal. Vertical partitions are disposed between feeding troughs and separate same sufficiently so that the animals do not disturb each other. A magnetic separation member, which may be an electromagnet, is provided to remove any metal which may be mixed with the fodder delivered to the feeding troughs. The components of the apparatus can be connected to the framework without tools.

6 Claims, 3 Drawing Sheets

FOREIGN PATENT DOCUMENTS

| | | |
|---|---|---|
| DE | 3029161 A1 | 2/1982 |
| EP | 0432702 A2 | 6/1991 |
| EP | 0677245 A1 | 10/1995 |
| EP | 0806136 A1 | 11/1997 |
| WO | PCT/SE87/00293 | 1/1988 |

* cited by examiner

FEEDING AND/OR DRINKING COLUMN ON BEHALF OF ANIMALS

RELATED APPLICATIONS

This is a Continuation of International Application No. PCT/NL99/00791, filed Dec. 21, 1999.

FIELD OF INVENTION

The invention relates to a column for feeding or drinking or both by animals, such as cows, said column comprising a central axis surrounded by several reservoirs and feeding troughs, as well as at least one metering device for dosing feed or liquid from at least one of the reservoirs to at least one of the feeding troughs.

BACKGROUND OF THE INVENTION

A disadvantage of known constructions is the size of the feeding or drinking column as a result of which the latter occupies much space in the shed. Furthermore, its construction is costly because components are used that are quite variable, depending on the number of animals to be fed and the specific wishes of the user.

SUMMARY OF THE INVENTION

An object of the present invention is to obviate the above drawbacks. For such purpose the column feeding or drinking or both is provided with a framework located around a central axis, to which framework primarily the feeding troughs and reservoirs are fitted. In this manner the construction occupies little space. Compactness may be increased in that a cross-section of the framework perpendicular to the central axis is substantially circular. There is also obtained a great accessibility of the feeding troughs in that the circumference of the feeding column is substantially circular. This makes it possible for the livestock to reach the feeding troughs easily from all directions. In this manner the capacity of the column for feeding or drinking or both can be utilized as efficiently as possible.

The column is providing with partitions disposed between the feeding troughs and having such dimensions that they prevent the animals from disturbing each other during eating or drinking, or from eating one another's feed. In this manner the animals are able to eat quietly, without being distracted by animals in the vicinity of the feeding troughs. The shortest distance between two adjacent partitions equals approximately the width of the outside of the feeding trough. Thus there is again achieved a great compactness of the feeding column. In a preferred embodiment of the invention, the number of partitions equals the number of feeding troughs.

The column in accordance with the invention can be easily be assembled because the components fitted to the framework are detachable. One or more components can be disassembled without tools being used, so that they can easily be fitted to the framework and be removed therefrom. The aforementioned components comprise a partition or a reservoir or a feeding trough or a combination thereof. Finally a component may also comprise a metering device. In this manner the column can easily be adapted to the user's wishes. Exchanging components is also very simple and the column's capacity can be utilized optimally and efficiently.

The components of at least one subset of components are similar in shape. Because of the fact that the column of the invention consists of uniform components, said components can be produced in large numbers, whereby production costs remain low.

In the preferred embodiment of the invention a storage room is located above the feeding troughs. As a result thereof a separate drive unit for transporting the feed is not required, as the gravitational force causes the feed to flow from the storage room to the feeding troughs. The metering device is preferably located in the middle of a cross-section perpendicular to the central axis of the framework so as to be able easily to serve the feeding troughs. Due to the fact that the reservoirs are almost contiguous they occupy little space. For the purpose of filling the reservoirs, the latter are provided with an opening for filling. The feeding troughs are almost contiguous as well, so that a maximum number of feeding troughs can be disposed along the circumference of the column. In a preferred embodiment of the invention, the number of feeding troughs equals the maximum number of animals to be fed that are able to position themselves side by side along the circumference formed by the totality of feeding troughs.

In a preferred embodiment of the invention, at a specific radius of the circular circumference of the framework the number of feeding troughs for feeding cows is twelve.

According to another inventive feature, the column is provided with at least one weighing device which is suitable for being used in a feeding trough or a metering device on both. By means of said weighing device it is possible to regulate the amount of feed in the metering device or the feeding trough or both. At least part of the weighing device is in particular movable about a central axis. Therefore, one or more weighing devices that can be used both for the metering device and for the one or more feeding troughs, will suffice. This has advantage that the cost of several weighing devices can be saved.

According to an inventive feature, the metering device is disposed between at least one reservoir and at least one feeding trough. In this manner it is achieved that the feed flows by gravitational force from a reservoir via the metering device to the feeding trough, so that separate drive means are not required. The metering device comprises at least one storage room, so that the feed or the ingredients thereof are not directly supplied to a feeding trough. The metering device may also comprise mixing means for mixing the material present in the storage room. The animals are thus prevented from eating selectively only specific feed ingredients. In a preferred embodiment of the invention, the metering device is movable about a central axis, and in particular rotatable about its central axis, so that it is possible to serve several feeding troughs by means of the metering device. To that end, according to an inventive feature, for moving the metering device the latter is provided with a drive unit.

In accordance with the invention, the feeding column of the invention further comprises removing means for removing substances that are unfit for consumption from the flow of feed. In this manner undesired feed ingredients, such as metal objects and plastics, can be removed from the feed. The removing means comprise at least one magnet or at least one electromagnet or at least one reel or any combination thereof. With the reel it is possible to remove metal objects from the flow of feed by means of eddy currents.

The column in accordance with the invention is provided with identification means for identifying an individual animal, while the column is capable of operating fully automatically. According to an inventive feature, before the animals are fed by means of the column, the individual animal is identified, after which, by means of the metering device, the feed is composed of ingredients emanating from one or more reservoirs, according to the nutritive needs of the individual animal, and the feed is supplied to the feeding trough. By means of a weighing device in the metering device, the amount of feed corresponds to the nutritive needs of the individual animal. In accordance with another inventive feature, during pouring the feed in to a feeding trough, the amount of feed is correlated to the nutritive needs of the individual animal by means of a weighing device. Finally the amount of feed can also be made to correspond to the nutritive needs of the individual animal by means of a weighing device in a feeding trough. Depending on the location of one or more weighing devices in the column and the assembly of the various components of the column, various configurations of various components are possible, while in the various configurations the weight of the feed supplied can each time be determined.

By means of a weighing device, which is in connection with the feeding trough, the eating speed of an animal is determined and the value thereof is subsequently stored in a computer memory. The nutritive needs of the individual animal are determined with the aid of one or more values stored in a computer memory and relate to the eating speed of the individual animal. The eating speed of an animal having greater nutritive needs will be considerably higher than that of an animal having small nutritive needs. The small nutritive needs may result for example from an animal's illness. Thus, the eating speed also relates to the animal's condition. According to a last inventive feature, the feed that has not been consumed by the individual animal is automatically removed from the feeding trough with the aid of removing means.

BRIEF DESCRIPTION OF THE DRAWINGS

The invention will now be explained in further detail with reference to the figures.

DETAILED DESCRIPTION OF THE PREFERRED INVENTION

Figure 1:
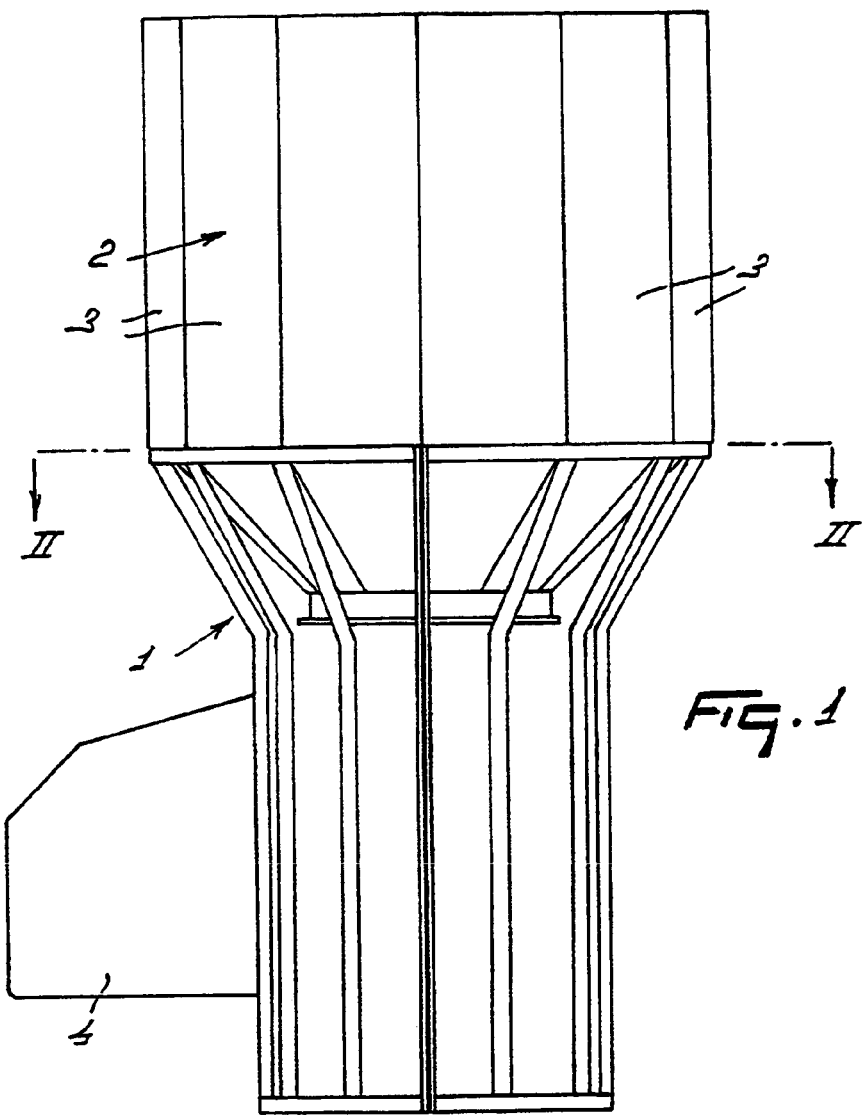
FIG. 1 is a side elevational view of the framework for the invention column provided with a storage room.

In the embodiment shown in FIG. 1, a framework 1 has a substantially circular circumference. At the upper side of framework 1 is a storage room 2 consisting of several reservoirs 3. On framework 1 facilities are provided for placing reservoirs 3.

Framework 1 is also provided with partitions 4 which are detachably arranged on framework 1. Framework 1 is preferably designed as a steel tubular construction.

Figure 2:
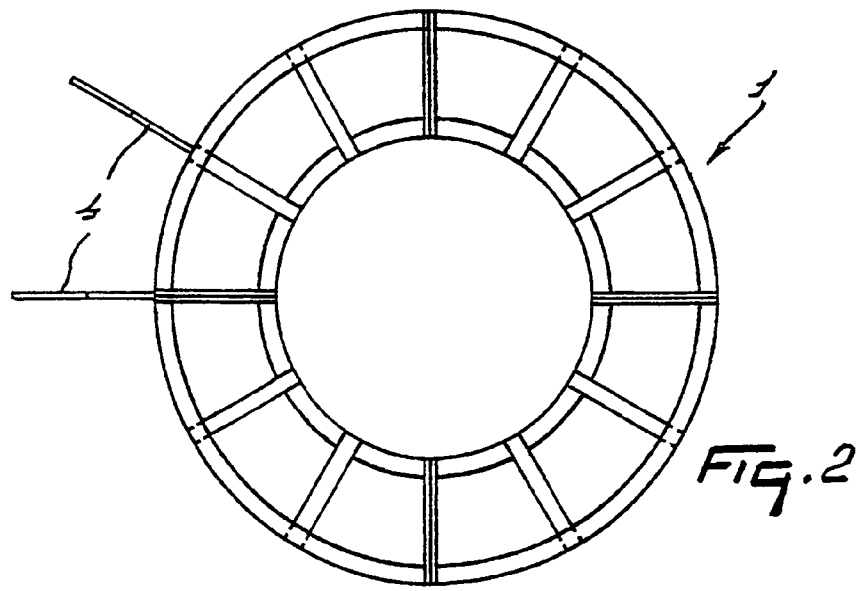
FIG. 2 is a plan view of the framework according to cross-section taken on lines II-II in FIG. 1.

FIG. 2 is a cross-section taken on line II-II of FIG. 1. Framework 1 is a divided into three segments per quarter. In this embodiment, a total of twelve cows can be fed at the same time.

Figure 3:
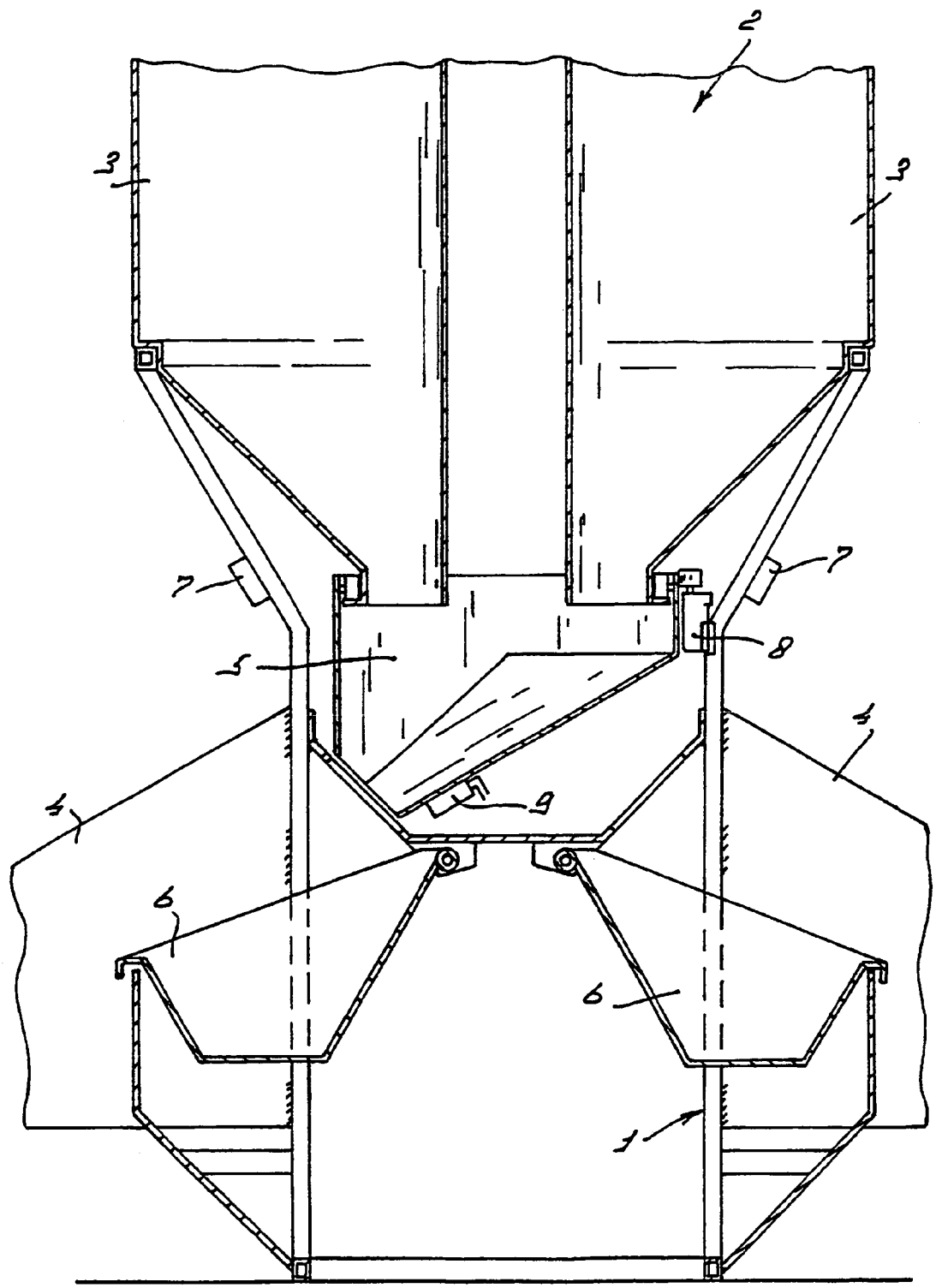
FIG. 3 is a broken vertical cross-sectional view of a column for feeding or drinking or both in accordance with the invention.

FIG. 3 is a vertical cross-section of the feeding column in accordance with the invention, showing framework 1, reservoirs 3, partitions 4, a metering device 5 which may be provided, if desired, with a storage room, feeding troughs 6, identification means 7 and a drive unit 8 for metering device 5. Because of the cylindrical geometry of the column the constructive occupies little space, while the column is optimally accessible to the animals from all directions. In metering device 5 there is disposed an electromagnet 9 by means of which metal objects are removed from the flow of feed.

Figure 4:
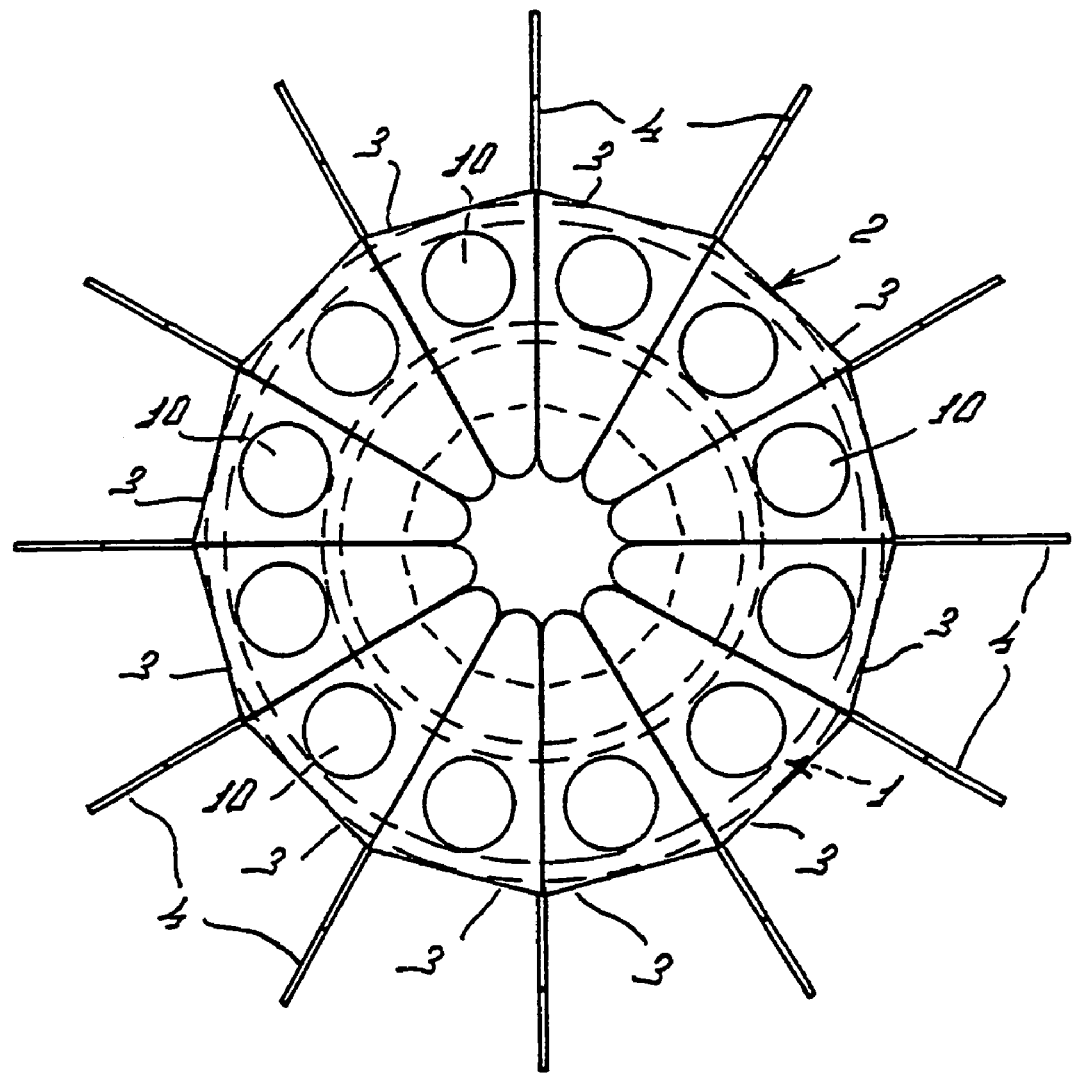
FIG. 4 is a plan view of the column of the invention provided with several reservoirs.

FIG. 4 is a plan view of the column of the invention showing reservoirs 3 with filling apertures 10, framework 1 and partitions 4.

Although I have disclosed the preferred embodiments of my invention, it will be understood by those skilled in the art that it is capable of other adaptations and modifications within the scope of the following claims.

Having disclosed my invention, what I claim as new and to be secured by Letters Patent in the United States of America is:

1. An apparatus for automatically feeding animals which comprises a circular framework disposed about a vertical axis which has on its upper aspect a storage house that contains a plurality of reservoirs, a plurality of delivering means connected to said framework below said storage house, a plurality of vertical partitions extending radially from said framework, a plurality of side-by-side feeding troughs disposed below said storage house and between individual partitions which they abut, said feeding troughs being arranged in a circle around said axis, said partitions extending sufficiently beyond said feeding troughs to provide individual side-by-side stalls arranged in a circle around said axis for each feeding trough, animal identification means operatively associated with each said feeding trough, a computer memory connected to said animal identification means wherein the nutrition needs for each animal feeding in said feeding trough are stored in said memory, weighing means operatively associated with each said feeding trough for determining the eating speed of an animal at such respective feeding trough, said reservoirs containing different feeds to provide fodder of different nutritional values, said reservoirs and said delivery means being controlled by said weighing means to deliver the amounts and types of fodder from said reservoirs to meet the nutrition needs of the animal at the feeding trough and said reservoirs respectively being substantially identical and being interconnected with said framework so that they are readily attachable and detachable therefrom at the site of the apparatus.

2. A column for providing at least one of feed or drink to animals, comprising:
    a central axis;
    a plurality of substantially contiguous reservoirs fitted about and substantially surrounding said central axis;
    a plurality of substantially abutting feeding troughs fitted about and substantially surrounding said central axis;
    a metering device for selecting a dose of the at least one of feed or drink from at least one of the reservoirs to at least one of the feeding troughs; and
    a weighing device to weigh the selected dose of the at least one of feed or drink delivered to the feeding trough from the reservoir, the weighing device being movable about said central axis;
    wherein, the column includes a framework positioned substantially around said central axis and connected thereto; and further
    wherein, the number of feeding troughs is substantially based on the maximum ratio of the occupied surface area of the animals when disposed in a close side-by-side position around said central axis.

3. A column for providing at least one of feed or drink to animals, comprising:
    a central axis;

a storage house comprising a plurality of substantially contiguous reservoirs fitted about and substantially surrounding said central axis;

a plurality of substantially abutting feeding troughs fitted about and substantially surrounding said central axis;

a metering device for selecting a dose of the at least one of feed or drink from at least one of the reservoirs to at least one of the feeding troughs and operationally associated with said storage house;

a mixing means for mixing material in said storage house;

wherein the column includes a framework positioned substantially around said central axis and connected thereto; and wherein, the number of feeding troughs is substantially based on the maximum ratio of the occupied surface area of the animals when disposed in a close side-by-side position around said central axis.

4. A column for providing at least one of feed or drink to animals, comprising:

a central axis;

a plurality of substantially contiguous reservoirs fitted about and substantially surrounding said central axis;

a plurality of substantially abutting feeding troughs fitted about and substantially surrounding said central axis;

a metering device for selecting a dose of the at least one of feed or drink from at least one of the reservoirs to at least one of the feeding troughs; and a separation means for removing materials unfit for consumption by the animals from the feed delivered to said troughs from said reservoirs;

wherein, the column includes a framework positioned substantially around said central axis and connected thereto; and further wherein, the number of feeding troughs is substantially based on the maximum ratio of the occupied surface area of the animals when disposed in a close side-by-side position around said central axis.

5. A column in accordance with claim 4, wherein said separation means comprises at least one magnet.

6. A column in accordance with claim 5, wherein said magnet is an electromagnet.

* * * * *